June 5, 1956 H. R. NACK ET AL 2,749,255
METHOD OF PRODUCING METALIZED GLASS FIBER ROVINGS
Filed May 24, 1952 2 Sheets-Sheet 1
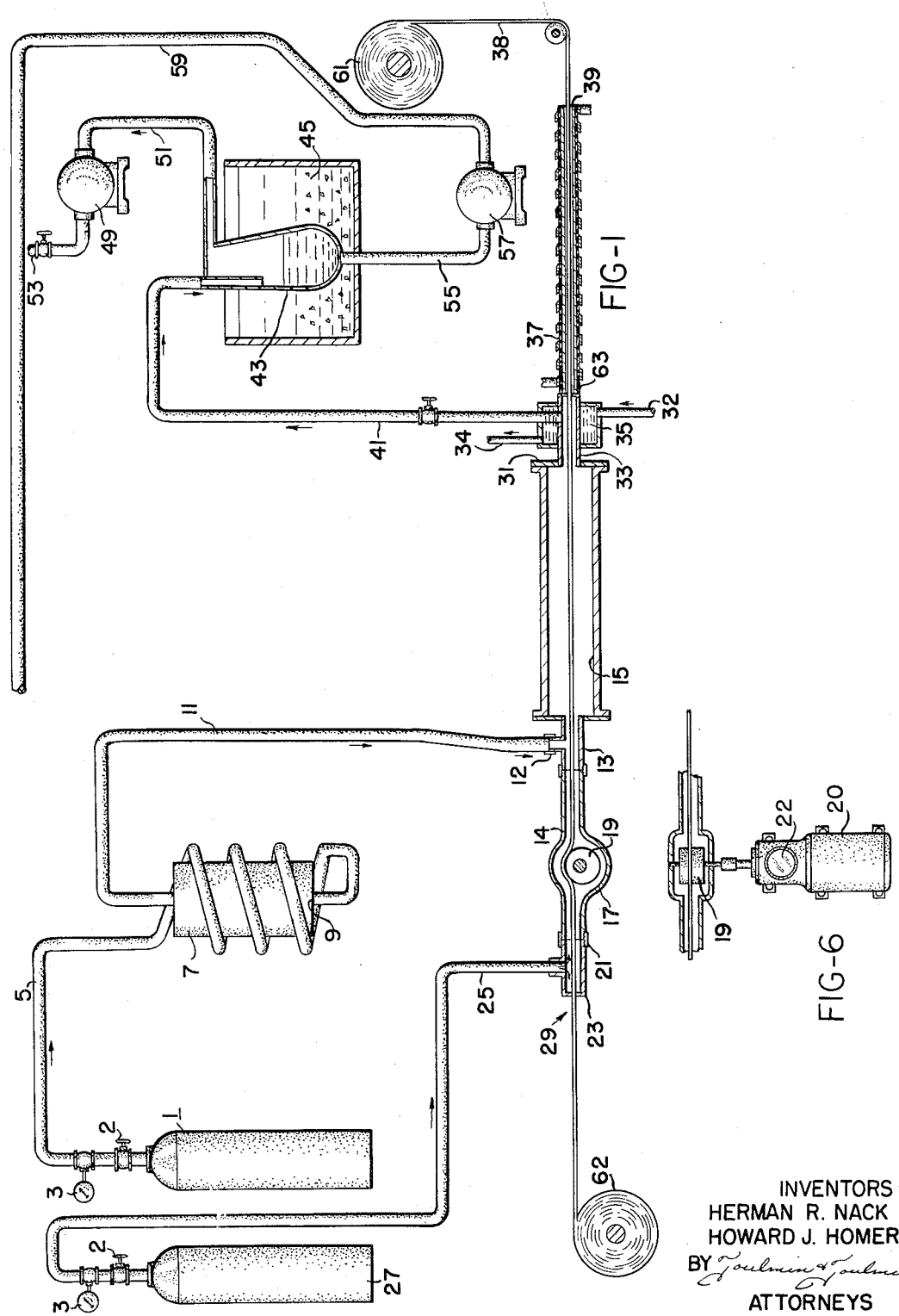
INVENTORS
HERMAN R. NACK
HOWARD J. HOMER
BY *Toulmin & Toulmin*
ATTORNEYS

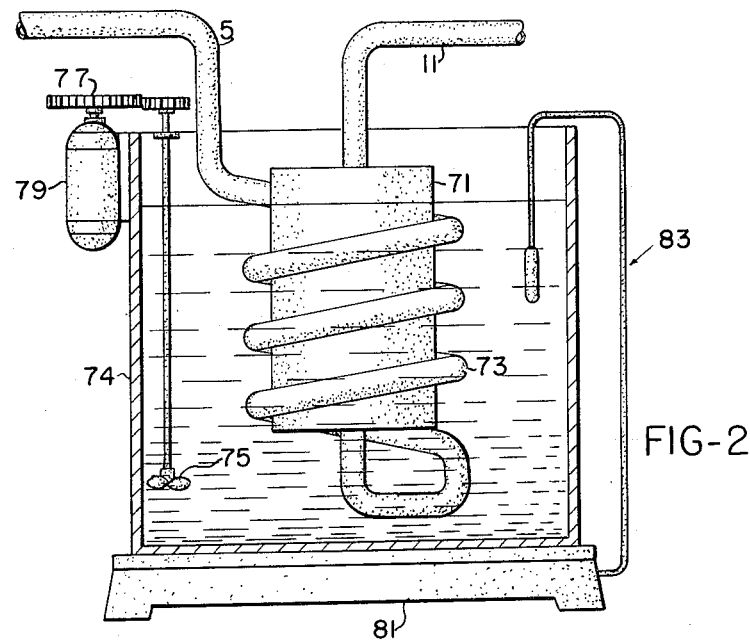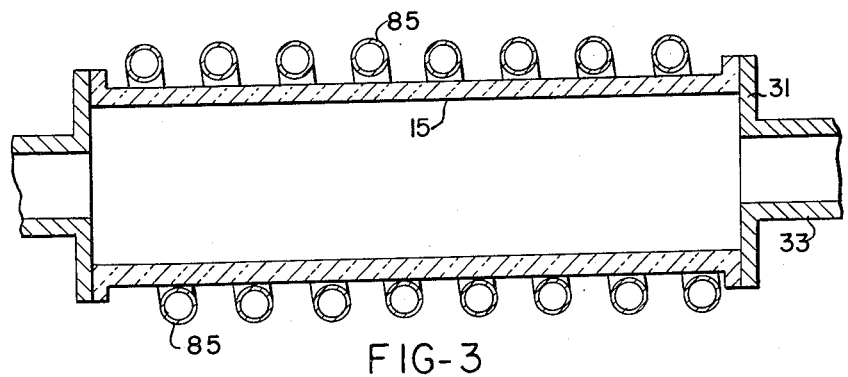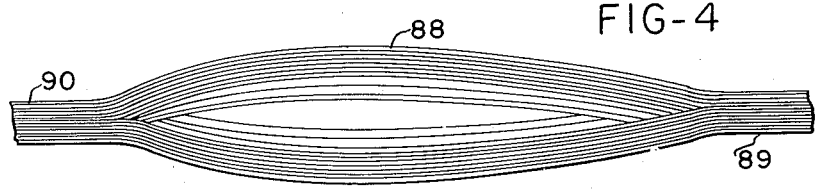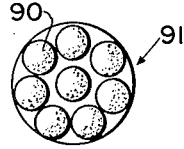

United States Patent Office 2,749,255
Patented June 5, 1956

2,749,255
METHOD OF PRODUCING METALIZED GLASS FIBER ROVINGS

Herman R. Nack, Troy, and Howard J. Homer, Dayton, Ohio, assignors to The Commonwealth Engineering Company of Ohio, Dayton, Ohio, a corporation of Ohio Application May 24, 1952, Serial No. 289,828

11 Claims. (Cl. 117—54)

This invention relates to a method and apparatus for the deposition of metallic coats on strands of glass fiber. More particularly the invention relates to the metallic coating of rovings of glass fiber.

In co-pending application, Serial No. 250,307, filed October 8, 1951, inventor Peter Pawlyk, and assigned to the same assignee as the present invention, there is described a method of coating fabrics of electrical insulating material with metallic films. It has now been found that while well suited to fabrics, the method described therein may be materially improved and rendered particularly satisfactory for the coating of rovings of glass fiber by the practice of the method described hereinafter.

Rovings consist in general of a multiple of straight, that is, untwisted strands, each strand comprising a very large number of glass filaments. Thus in one roving there are eight strands and each strand consists of approximately 204 closely associated filaments; thus in the roving there are 1632 filaments of very small diameter, that is, about 10 microns each. Due to this very large number of filaments in close contact the application of metallic coatings to the rovings affords considerable difficulty particularly where the coating must provide a path of relatively good electrical conductivity, as only slight discontinuity in the coating will thus increase the resistance of the article materially.

Accordingly, it is a primary object of this invention to describe a novel method of coating a glass fiber roving with metal deposited from the vapor state.

It is an important object of this invention to describe a method of coating flexible fiber glass strands with metal, which method results in a product of high flexibility.

It is another object of this invention to provide a method capable of producing metal coated glass fiber strands at high speeds.

It is a particular object of this invention to describe a novel glass plating apparatus capable of effecting varying tensioning in the strand or strands subjected to the action of the plating gas.

Yet another object of this invention is to describe novel gas plating apparatus capable of coating a glass fiber or strands at high feet per minute speed.

These and other allied objectives of the invention are attained generally speaking by providing for the heating of the glass fiber strand or strands to the decomposition temperature of a metal bearing heat decomposable gaseous compound and vibrating the heated strand in an atmosphere of the gaseous compound to attain a uniform deposition of the metal on each of the glass filaments comprising the strand. The imparting of a mechanical vibration to the strand spreads the filaments thereof and allows the gas to contact the filament surface intimately and uniformly. In this connection it is to be noted that the heavy strands separate from each other rather readily but the filaments comprising each strand spread with more difficulty, although under the operating conditions noted hereinafter sufficient motion is attained by each filament to free it temporarily of contact with all others, thus permitting the gas to deposit metal on the filament surface. However, upon removal of the vibratory motion the filaments readily compact and the strands reform to substantially a condition of the unmetalized state.

The vibratory movement is preferably attained by drawing the material to be coated through the gas plating chamber in a slightly taut condition and then applying to the taut material a repetitive impulse which sets the strand into motion. The motion imparted is preferably as vigorous as the filamentary material will permit, for as the motion is increased the degree of spreading of the filaments increases, permitting rapid drawing of the strands through the plating area, thus enabling the achievement of high production speeds. While the speed of drawing is effected by other factors, such as the plating conditions, including the concentration of the metal bearing gas and the temperature of the roving, it may be stated generally that a drawing speed of 1 foot to 300 feet per minute is readily attained by the process and apparatus of this invention. Also the frequency of the impulses per minute applied to the moving roving is preferably relatively high and frequencies of 520 to 1750 impulses have been generally employed, although lower impulse rates may be utilized, and the invention is not to be considered as limited to the preferred stated range.

The plating conditions are in themselves not to be considered as critical. It is of course necessary that the material constituting the roving be heated to at least the minimum temperature of decomposition required for the metal bearing gas employed. It is also preferable that the plating gas flow countercurrent to the moving heated roving, for the roving will be lowered slightly in temperature by contact with the cooled gas, and under this counter-current flow condition the roving will have attained a slight coating of metal before much cooling occurs. In this slightly coated condition further deposition of metal is rendered more easy and where desired a slight deposit may be inductively heated to compensate for any temperature losses. However, this factor is only important where the operating conditions, particularly temperature, closely approach marginal conditions.

While it is preferred to use nickel carbonyl as the plating material, and the particular description of the process and apparatus set forth hereinafter will be directed thereto, other metal bearing gases such as copper acetyl acetonate, molybdenum carbonyl and chromium hexacarbonyl, as well as the metallic hydrides, are subject to employment in the apparatus and process of invention and may be utilized where the characteristics of nickel are not satisfactory for the purposes of the product.

The operating pressures may vary over wide ranges from the subatmospheric to the atmospheric, but it is generally preferred to employ substantially atmospheric plating pressures, as operation under this condition permits the use of relatively simple apparatus. For example, the use of complicated sealing for the plating chamber is avoided.

The invention will be more fully described by reference to the following detailed description and accompanying drawings wherein:

Figure 1 is a preferred embodiment of the apparatus of invention including a carburetor and plating chamber;

Figure 2 illustrates a modification of the carburetion system;

Figure 3 illustrates a modification of the plating chamber;

Figure 4 illustrates the roving material in the unplated spread condition;

Figure 5 is a cross sectional view of the compact plated roving; and

Figure 6 is a plan view of one form of vibrating mechanism.

Referring to the drawings there is shown in Figure 1 at 1 a cylinder containing carbon dioxide under pressure the cylinder being equipped with a valve 2 and a gauge 3 for indicating the flow of gases through a line 5 terminating in a carburetor 7 as at 9. Secured to the upper end of the carburetor 7 is an exit conduit 11 terminating at 12 in one arm of a T 13. Secured to the T 13 leftwardly thereof is a longitudinal chamber 14 provided with an enlarged portion 17 containing an eccentric shaft 19 driven through a speed mechanism 20 and controlled as indicated at 22 in Figure 6. Coupled to the chamber 14 by nipple 21 is a tubular portion 23 connected by a conduit 25 to a second source of carbon dioxide 27. The portion 23 at the extreme left end is also provided with a narrow aperture indicated generally at 29.

Referring now to the T portion 13 a plating chamber 15 of glass is secured at the right hand end thereof and this chamber 15 is itself provided with a tubular flange member 31 having an extension 33 surrounded by a cooling means 35. Cooling means 35 is preferably simply a water chamber through which water at approximately room temperature flows continuously by means of inlet 32 and outlet 34. This cooling means serves to isolate heater 37 from the chamber portion 15 and accordingly it will be noted that the roving 38 as it passes from reel 61 through opening 39 is preferably heated only by heater 37, it not being necessary to provide heating means about the chamber 15.

Connected into extension 33 is an exhaust line 41 terminating in a trap 43 the temperature of which may be maintained at approximately minus 20° C. to effect the condensation of nickel carbonyl to the liquid state. For this purpose Dry Ice indicated at 45 may surround the chamber.

Extending from the upper portion of the trap 43 is a conduit 51 in which there is provided a pump 49 for the expulsion of gases through the exhaust 53 to a burner (not shown). This burner may simply be a resistance heater over which the uncondensed material flows to insure complete combustion of the gas. Extending from the bottom of the trap 43 is a conduit 55 having a pump 57 for the return of recovered carbonyl through line 59 to line 5.

In the instance under discussion the carburetor 7 contains liquid nickel carbonyl and under this condition both the $CO_2$ carrier gas and liquid carbonyl flow may be effected at room temperature. However, in instances where it is desirable to use a compound solid at normal temperatures, such as copper acetylacetonate for the production of the metal bearing gas it is necessary to use a carburetor arrangement as indicated in Figure 2 wherein there is shown a carburetor 71 surrounded by oil 73 in chamber 74, which chamber is provided with a stirrer 75 connected through a suitable mechanism 77 to a motor 79 for agitation of the oil.

The heater 81 provided with a thermostatic control indicated generally at 83 controls the flow of heat to the oil bath in a known manner. This arrangement is particularly useful where a vapor pressure of the metal bearing compound is low at normal temperatures.

In the operation of the apparatus of Figure 1 carbon dioxide is flowed under controlled conditions to line 5 through carburetor 7 where it sweeps up the vapors of the nickel carbonyl and carries them through conduit 11 into chamber 15. To insure that there will be no leakage of the carbonyl gases to the chamber 15 a second source of carbon dioxide is simultaneously flowed from cylinder 27 through line 25 and provides a slight vapor pressure of carbon dioxide in the portion 23. While under this condition some slight amount of carbon dioxide may escape through the aperture 29 this is not a serious loss.

The initial flow of gases through line 11, T 13 and chamber 15 sweeps out oxygen, etc. contained in chamber 15 and the associated lines and passes these gases to the atmosphere.

Thereafter the roving on reel 61 which has been strung through the apparatus as indicated in Figure 1 is motivated by a source of power (not shown) connected to reel 62. The heater 37 at this time is turned on and the roving passing through the heater is raised in temperature thereby. The temperature attained by the rovings preferably is about 600° F. and the heated material passing into chamber 15 countercurrent to the flow of carbonyl plating gas contacts the roving causing metal to be deposited upon the roving.

The eccentric 19 which has been set into operation simultaneously with the movement of the rovings through the apparatus causes the strand portion contained in chamber 15 to vibrate rapidly and each strand accordingly opens up as indicated very generally at 88 in Figure 4 to expose each of the 204 filaments to the action of the plating gas. As shown in Figure 4 the portion 89 as it enters the chamber separates into filaments while in the chamber and these filaments reconverge as indicated at 90. Upon exiting from the chamber the metallic material acquired during the course of traverse of chamber 15 effects compacting of the filaments very little and the complete roving shown at 91 in Figure 5 possessed the physical characteristics of the glass fiber as to strength and flexibility and in addition is lustrous and electrically conductive.

Preferably the amplitude of vibration of the fibers 88 covers substantially half of the vertical height of the chamber 15 and the eccentric shaft 19 may be readily selected to accomplish this purpose. It will be noted in this connection that the shaft 19 is preferably adjusted such that when the roving is pulled taut between the reels 61 and 62, the roving forms a straight line across and tangent to the upper surface of shaft 19 in the down position of the eccentric. Upon rotation of the eccentric the fiber is forced upwardly causing a rapid vibration of the roving in the chamber. At a speed of rotation of the eccentric 19 of about 520 R. P. M. the amplitude of vibration will be about ¼ to ⅜ of an inch in chamber 15 with the roving under consideration having 8 strands, each strand of which comprises 204 filaments of about 10 microns diameter each.

The gas flowing into the leftward end of the chamber 15 will then be agitated by the motion of the roving, a factor which leads to uniformity of plating. Also the roving will always be exposed to fresh increments of the gas which tends to further increase the uniformity and to enhance the speed of plating.

The cooling water chamber 35 or some cooling arrangement is necessary to prevent decomposition of the metal bearing gases in the tubular portion 33. The cooling effect is not sufficient to decrease the temperature of the roving materially.

In the event that under some plating conditions it may be desirable to maintain the temperature of the roving low such that the temperature drop of the roving as it traverses the chamber would be so great that no plating would be effected at the left hand end of the chamber, a structure as indicated in Figure 3 may be employed wherein the plating chamber 15 of glass is shown surrounded by an induction heating coil 85. When using this arrangement the temperature of the roving at the right hand end of chamber 15 may be sufficient to effect the deposition of at least a slight amount of metal on the fiber. Thereafter the heating coil 85 will raise the temperature of the metal on the fiber and maintain it at such a temperature that further deposition may be effected as the roving traverses the chamber. In either event gases of decomposition and those metal bearing gases that are not decomposed are passed, as noted hereinbefore, through line 41 to trap 43 wherein the major portion of the liquid carbonyl may be settled out for reuse in carburetor 7.

A particularly important feature of the apparatus of invention involves the structure of the opening at 63 wherein the heated roving passes through the right hand extremity of the portion 33. The aperture 63 may initially have a diameter of approximately that of the fiber and during the course of operation metal carbonyl contacting the portion 33 about the aperture 63 may be caused to deposit small amounts of metal around the aperture 63. Thus operation of the unit effects a seal formation particularly adapted to the roving passing therethrough. Thereby also a slight friction is placed on the moving roving and the resulting tension occasioned, together with the impulse afforded by cam or eccentric 19 renders vibration of the roving relatively simple.

The process of invention provides a thoroughly coated roving of excellent luster, the flexibility of which is not impaired by the thin metallic coat. The metallic coating is electrically conductive and the conductivity is controllable by varying the thickness of the coat only since the uniformity of plating is exceptionally accurate. Thus for example, glass fiber rovings have been produced, having a coating of nickel thereon, which show electrical resistances of 1 ohm per inch, 2 ohms per inch, and 6 ohms per inch.

In connection with the control of the electrical resistance of the roving, it has been quite unexpectedly found that if the roving described hereinbefore is passed through a concentration of the metal bearing gas, which is relatively low, that a deposit of about 20 ohms per inch may be readily attained. If this material is wound in accordance with the described method and then repassed through the chamber under exactly the same conditions the resistance of the completed roving will be about 3 ohms per inch. This large unexpected drop is considered to be due to the fact that the metal deposited in the first pass is more easily coated than the roving itself and consequently a greater deposition takes place in the second pass than in the first even though the plating conditions be identical.

It is to be noted that while one particular roving has been described that other glass fiber rovings may be similarly treated and are understood to be within the scope of the invention.

It will be understood that this invention is susceptible to modification in order to adopt it to different usages and conditions and accordingly, it is desired to comprehend such modifications within this invention as may fall within the scope of the appended claims.

We claim:

1. A process of plating a glass fiber roving consisting of a plurality of untwisted strands comprising a multiplicity of filaments with metal comprising the steps of heating the roving to the decomposition temperature of a heat decomposable gaseous metal bearing compound, and contacting the roving with said gaseous compound while vibrating the roving at a rate sufficient to expose the individual strands to the gaseous compound whereby metal is deposited on said roving uniformly.

2. A process of plating a glass fiber roving consisting of a plurality of untwisted strands comprising a multiplicity of filaments with nickel comprising the steps of heating the roving to the decomposition temperature of a heat decomposable gaseous nickel bearing compound, and contacting the roving with said gaseous compound while vibrating the roving at a rate sufficient to expose the individual strands to the gaseous compound whereby nickel is deposited on said roving uniformly.

3. A process of plating a glass fiber roving with metal comprising the steps of heating the roving to the decomposition temperature of a heat decomposable gaseous metal bearing compound, and contacting the roving with said gaseous compound while vibrating the roving at frequencies of between about 520 to 1750 cycles per minute whereby metal is deposited on said roving uniformly.

4. A process of plating a glass fiber roving with nickel comprising the steps of heating the roving to the decomposition temperature of a heat decomposable gaseous nickel bearing compound, and contacting the roving with said gaseous compound while vibrating the roving at frequencies of between about 520 to 1750 cycles per minute whereby nickel is deposited on said roving uniformly.

5. A process of plating a glass fiber roving consisting of a plurality of untwisted strands comprising a multiplicity of filaments with metal comprising the steps of heating the roving to the decomposition temperature of a heat decomposable gaseous metal bearing compound, and contacting the roving with said gaseous compound contained in a carrier gas while vibrating the roving at a rate sufficient to expose the individual strands to the gaseous compound whereby metal is deposited on said roving uniformly.

6. A process of plating a glass fiber roving consisting of a plurality of untwisted strands comprising a multiplicity of filaments with metal comprising the steps of heating the roving to the decomposition temperature of a heat decomposable gaseous metal bearing compound, and contacting the roving with said gaseous compound contained in carbon dioxide while vibrating the roving at a rate sufficient to expose the individual strands to the gaseous compound whereby metal is deposited on said roving uniformly.

7. In a method of gas plating glass fiber rovings which consist of a plurality of untwisted strands having a multiplicity of filaments the steps of heating a roving to the decomposition temperature of a heat decomposable metal bearing gas, drawing a continuous length of roving through an aperture having substantially the same diameter as the roving whereby tension is created in the roving, thereafter repetitively impulsing a portion of the roving which has passed through said aperture to vibrate the roving at a rate sufficient to expose the individual strands to the gaseous compound, and contacting the vibrating heated roving with vapors of the metal bearing gas to effect deposition of the metal on the roving.

8. In a method of gas plating a glass fiber roving which consist of a plurality of untwisted strands having a multiplicity of filaments having a relatively low softening point the steps of heating a roving to the temperature of decomposition of a heat decomposable metal bearing gas, and below that at which the glass softens, contacting the heated roving while vibrating the same in vapors of the heat decomposable metal bearing gas at a vibration rate sufficient to expose the individual strands to the gas to effect some deposition of metal on said roving strands, and inductively heating the metal on said roving while vibrating in the presence of said gas to effect further deposition of said metal on said roving.

9. In a method of gas plating a glass fiber roving which consist of a plurality of untwisted strands having a multiplicity of filaments having a relatively low softening point the steps of heating a roving to the temperature of decomposition of a heat decomposable metal bearing gas, and below that temperature at which the glass softens, and contacting the heated roving while vibrating the same in vapors of the heat decomposable metal bearing gas at a vibration rate sufficient to expose the individual strands to the gas to effect some deposition of metal on said roving strands, and then repassing said coated roving vibrating through an atmosphere of said heat decomposable metal bearing gas to effect further deposition of metal on said roving.

10. As an article of manufacture, a roving of glass fibers gaseous metal plated in accordance with the process of claim 1.

11. As an article of manufacture, a roving of glass fibers gaseous metal plated in accordance with the process of claim 2.

(References on following page)

References Cited in the file of this patent

UNITED STATES PATENTS

| | | |
|---|---|---|
| 1,710,747 | Smith | Apr. 30, 1929 |
| 1,987,577 | Moers | Jan. 8, 1935 |
| 2,251,913 | Brennan | Aug. 12, 1941 |
| 2,325,126 | Giesler | July 27, 1943 |
| 2,326,372 | Lignian | Aug. 10, 1943 |
| 2,344,138 | Drummond | Mar. 14, 1944 |
| 2,382,432 | McManus et al. | Aug. 14, 1945 |
| 2,616,165 | Brennan | Nov. 4, 1952 |

OTHER REFERENCES

Cline et al.: Journal Electrochemical Soc., October 1951, vol. 98, #10 117–M. C., pp. 385–387.